United States Patent [19]
Chandler

[11] Patent Number: 5,937,910
[45] Date of Patent: Aug. 17, 1999

[54] LININGS FOR PIPELINES AND PASSAGEWAYS

[75] Inventor: Brian Burnett Chandler, Steinermark, Austria

[73] Assignee: Sound Pipe, Ltd., Grand Turk, Turks/Caicos Islands

[21] Appl. No.: 08/557,067

[22] PCT Filed: Jul. 5, 1994

[86] PCT No.: PCT/GB94/01453

§ 371 Date: Nov. 13, 1995

§ 102(e) Date: Nov. 13, 1995

[87] PCT Pub. No.: WO95/01861

PCT Pub. Date: Jan. 19, 1995

[30] Foreign Application Priority Data

Jul. 6, 1993 [GB] United Kingdom .................. 9313901

[51] Int. Cl.⁶ .................................................. F16L 55/16
[52] U.S. Cl. .............................. 138/97; 138/98; 156/294; 264/269; 264/36.1
[58] Field of Search ..................... 138/98, 97; 156/156, 156/94, 287, 294; 264/516, 572, 36.1, 269, 563

[56] References Cited

U.S. PATENT DOCUMENTS

| | | |
|---|---|---|
| 3,036,983 | 5/1962 | O'Connor . |
| 3,607,830 | 9/1971 | Kearnan et al. . |
| 3,618,599 | 11/1971 | Beightol . |
| 3,896,969 | 7/1975 | Basile . |
| 4,581,247 | 4/1986 | Wood ................................ 156/287 X |
| 4,680,066 | 7/1987 | Wood ................................... 156/156 |
| 5,200,666 | 4/1993 | Walter et al. ........................... 310/323 |

FOREIGN PATENT DOCUMENTS

| | | |
|---|---|---|
| 100474 | 2/1984 | European Pat. Off. . |
| 0287288 | 10/1988 | European Pat. Off. . |
| 0363006 | 4/1990 | European Pat. Off. . |
| 0551790 | 7/1993 | European Pat. Off. . |
| 1420177 | 4/1959 | Germany . |
| 909267 | 10/1962 | United Kingdom . |
| WO 85/04886 | 11/1985 | WIPO . |
| WO 87/05376 | 9/1987 | WIPO . |
| WO 90/10032 | 9/1990 | WIPO . |
| WO 92/20504 | 11/1992 | WIPO . |

*Primary Examiner*—Patrick F. Brinson
*Attorney, Agent, or Firm*—Cowan, Liebowitz & Latman, P.C.; Michael I. Wolfson

[57] ABSTRACT

The invention provides that flexible lining tubes for application to underground pipelines and passageways comprise absorbent material which is impregnated with curable synthetic resin which can be cured when the tube is placed on the pipeline or passageway surface so that a rigid pipe within the pipe is formed. The curing of the resin is controlled by filling the curing agent into micropores or microporous particles which are dispersed throughout the resin. The curing agent is only released when the resin is subjected to applied energy such as sonic and/or heat energy. A preferred method is to include CURIE temperature magnetic particles in the resin and to excite (and thus heat) the magnetic particles by applying an alternating high frequency magnetic field. The heat from the magnetic particles opens the microporous particles and causes desorbence of the curing agent and then cure of the resin. The invention also provides that the curing agent is absorbed into the absorbent layer in the first place using sonic energy.

16 Claims, 4 Drawing Sheets

LININGS FOR PIPELINES AND PASSAGEWAYS

BACKGROUND OF THE INVENTION

This invention relates generally to tubular linings for pipelines or passageways which linings are of a type known as 'softlinings' or 'cured in place' linings which employ resin absorbent material which is impregnated with curable resin which has been conditioned in order that it may be cured to produce a pipe on the surface of the pipeline or passageway (typically an underground sewer) thereby in effect forming a pipe within a pipe.

The lining to which the invention relates is a resin absorbent tubular structure (herein the "lining tube or pipe") which is to be used for lining an underground pipeline or passageway such as a sewer. In such utilization, which is now practiced widely throughout the world, the impregnated lining tube is inflated (by gas such as air, steam and/or liquid such as water) against the pipeline or passway surface whilst the resin is uncured, and whilst the lining tube is so held in position, the resin is allowed or caused to cure whereby the cured resin with the absorbent tubular structure embedded therein forms a self supporting rigid pipe, which may or may not bond to the pipeline or passageway wall. The purpose of this operation is to rehabilitate and/or repair the passageway or pipeline. A particular advantage of the provision of a self supporting rigid pipe is that bonding to the existing pipeline is not necessary, as is the case with some lining systems but it is to be mentioned that this invention can be applied to pipelining systems where the impregnated tube does bond to the existing pipeline or passageway, such systems being those wherein the lining tube is of relatively small thickness e.g. 5 mm or less and the resin acts like a bonding medium rather than an impregnating medium.

Also the lining tube when the resin is in the uncured state may not strictly be a tube in that it may be a web folded into tubular form so that its edges overlap and such edges become fused or held relatively together only when curing in place has been effected. In fact, this arrangement provides the advantage that the overlapping edges can slip relatively as the tube is being inflated so that the tube will best fit to the passageway surface.

Examples of methods of lining of underground pipelines and passageways using impregnated lining tubes which are cured in place are contained in many patent specifications of which examples are U.K. Patent No. 1,340,068, which is the original patent for this technology, and U.K. Patent No. 1,449,445.

All or by far the majority of the methods which are practised throughout the world using cured in place lining tubes for lining underground pipelines and passageways simply use a heat curable resin (e.g. polyester and heat for the curing of the resin, the application of heat causing a catalyst and/or promoter (accelerator) in the resin to release free radicals and commence cross linking of the resin molecules and crystal formation; the curing reaction is exothermic and heat is internally generated and the curing process accelerates.

One disadvantage of this arrangement is that even if heat is not applied to the impregnated lining tube, under ambient conditions the resin will eventually cure in a matter of days and of course if curing takes place before the lining tube is in place on the passageway of pipeline surface, the lining tube is completely lost and must be scrapped. This can represent a considerable loss if not a complete loss of profit on a contract. Should the lining tube cure when it is part way inside the pipeline or passageway, then the consequences financially could be disastrous for the contractor. In order to avoid the problem of the resin curing too soon, i.e. before the lining tube is in place, contractors have resorted to extensive measures, in particular to keeping the impregnated tube refrigerated until it is to be used on site. This means that the tubes must be delivered to the site in refrigerated vehicles.

The effect of this procedure is that the contractor is limited in terms of when he can mix the resin and impregnate the lining tube.

Ironically, however, once the tubes have been put in place, it is desireable that the resin should be cured as fast as possible, as the sooner the resin cures, the sooner the contractor can leave the site. It is to be noted that the contractor will often be given or will often quote a relatively short time for completion of the work, usually undertaken during the night. It is very important therefore that the work be completed in the shortest possible time, especially in these cases where the performance of the work involves the rendering inoperative (as it does in many cases) of a sewage system or the blocking or obstructing of traffic.

To perform the contract therefore the contractor must on the one hand have a factory or plant at which the tube is impregnated, a vehicle for keeping the impregnated tube refrigerated and a vehicle with a heating means for heating the fluid which inflates the tube when in place, in order to effect the curing of the resin, as well as the necessary equipment for putting the tube into place.

There is also the dilemma concerning the resin. On the one hand it is desireable that it should have as long a shelf life as possible to give the contractor plenty of time to place the tube in the pipeline or passageway before curing. On the other hand, when the tube is in place, it is desireable that curing should take place as quickly as possible. Unfortunately this dilemma has proved so far to be insoluble as the additives such as retarders for the resin which can increase shelf life of the resin also increase the cure time of the resin.

Consequently, when a contractor has to perform a contract, he must have the lining tube manufactured, and, immediately before he is to insert the lining tube, he impregnates the tube with the resin, transports it to site (which may be remotely located) as quickly as possible, and inserts the lining tube and cures it as quickly as possible. As soon as the resin is mixed with its catalyst for impregnation of the lining tube, there is a time countdown, and the contractor is racing against time.

The industry is aware of this problem and some attempts have been made to solve it by developing special resins which are 'quiescent' or 'latent' and do not cure for a long time until activated by some external source which are examples of resins curable by light radiation, such as are disclosed in European Patent Specification No 0007086, and methods of cured in place lining with impregnated lining tubes using light radiation are disclosed in U.S. Pat. No. 4,581,247 and 4,680,066.

Light radiation curable resins however include catalysts which are activatable by the suns rays and therefore the impregnated lining tubes must be contained in opaque wrappings during storage and transportation to avoid premature curing.

Light radiation curable resin does however have the advantage that curing of same can be controlled and theoretically the resin has an infinite shelf life. When it comes to curing the in place impregnated tube however, problems arise. Thus, special ultra violet light sources are needed to cure the resin; and when, as is often the case, the inflating medium is water, that water may be dirty in which case light curing cannot be performed. When the flowing liquid in the pipeline or passageway is opaque, as sewage is, it must be diverted and the use of light curing equipment suffers from the same disadvantage in this respect as heating-methods. For these reasons, in practice, light curing of in place impregnated lining tubes has not been successful and has not replaced the traditional heating methods.

The invention the subject of International Patent Application No. PCT/GB93/00107, of which I am joint inventor, seeks to provide latent curable resin systems for the production of rigid articles wherein the resin can be cured readily and quickly, but retains a long to infinite shelf life (e.g. one year or more) making it particularly suitable for use in cured in place lining systems for pipelines and passageways.

According to the invention the subject of said International Application in its most general aspect the resin includes or is located adjacent inert matter which is not affected by ambient conditions such as ambient heat and light, but such matter is susceptible to applied radiation to such an extent to cause curing or commencement of curing of the resin.

There are various forms which the said matter can take, and such forms can be used singly or in combination.

In one specific example, the matter comprises microencapsulation shells in which is contained a catalyst for the resin, or a promoter (accelerator) or both, the shells being susceptible to the ultrasonic radiation to rupture the cells to release the catalyst/promoter, and hence cause commencement of the cure.

Difficulties with the use of means capable containing catalysts/accelerators have been encountered. Thus, it is difficult to produce the micro-capsules. Secondly, it is difficult to produce micro-capsules of sufficiently small size so that they will satisfactorily be spread throughout the absorbent material of the lining. Thirdly, it is not easy always to rupture the micro-capsules to release the resin and if rupture is not even and homogenous, cure can be uneven, which is highly undersirable.

The said International application also describes the use of individually heatable particles (iron particles) in the resin, but the difficulty with this concept is that it requires the use of an electrical induction source of high frequency inside the pipeline which may be full of water, and the problems associated therewith have not been solved.

The present invention has as its object to provide a lining tube impregnated with a latent resin system which can be selectively activated for the cure of same more predictably and normally quicker than the known proposals.

According to the present invention there is provided a lining tube comprising an absorbent layer impregnated with a resin system which comprises a resin matrix and a catalyst and/or an accelerator, characterised in that the catalyst and/or accelerator is absorbent in micro pores of microporous particles distributed throughout the resin matrix.

By having the catalyst and/or the accelerator absorbed in the micropores of the particles, as opposed to contained in shells of microcapsules, considerable advantages are obtained including that the catalyst and/or accelerator can be released into the resin matrix much lesser than in the case of replacing the microshells. For example, the application of heat has been found to cause opening of the pores of the microporous particles and quick release of the contained substance which leads to rapid and even cure of the resin matrix, which is important in the application of lining underground sewers.

The release of the contained substance can also be achieved by the application of ultrasonic energy, which achieves opening of the said pores by the mechanical and heat energy generated in the resin matrix, and ultrasonic energy can readily be passed through liquid especially water and there is no difficulty in using such energy inside an underground pipe.

Again, it is possible to include in the resin matrix cure enhancing particles of a material which is susceptable to the electromagnetic variation of an alternating magnetic field and will heat up due to eddy current and hysteresis losses. The heat guaranteed by such particles can be used for the opening of the pores of the absorbent particles.

Microporous particles as used in the invention will have a maximum size having agreed to the fact that they must be dispersed throughout a resin absorbent material, such as a fabric, typically a needled felt and in this connection the particles would be unlikely to exceed $100\mu$ in size. They would more likely be in the range up to maximum of $15\mu$ to $20\mu$ and optimally we would prefer that the particles be in the size range $7\mu$ to $15\mu$. It is appreciated that in any mass of particles, there will be a particle size distribution and some particles will be of a size above the range whilst others will be of a size below the range.

The micro porous particles may comprise clay particles and the clay particles may be arranged in two groups, one of which has a catalyst adsorbed therein, whilst the other group has the promoter adsorbed therein. When the resin matrix is a polyester resin the catalyst preferably is Dibenzoyl Peroxide, and the promoter is an amine. In such case, the clay of said one group preferably is different from the clay of the other group.

Clay particles are made up of micro platelets having micro pores therebetween which form the pores into which the catalyst and/or promoter is absorbed. In tests carried out it has been found that on using clay particles supplied by In Porte under the description FULMONT XMP4 of particle size normally $20\mu$ the clay particles absorbed the catalyst Benzoyl Peroxide to an extent that up to 60% of the final particle weight comprised the Benzoyl Peroxide. Also clay particles supplied by In Porte under designation CP639 of nominal particle size $15\mu$ absorbed the amino accelerator diethyl aniline to an extent to form 30% of the weight of the final particle.

Using these "filled" microforms particles in a resin matrix of polyester Crystic 397 supplied by Scott Bader and subjecting it to ultrasonic energy as explained in more detail herein provided an effective resin cure.

The catalyst and the promotor were absorbed into the clays by the use of ultra sonic energy. It is believed that this energy drives the molecules of the catalyst and the accelerator into the micropores of the particles and to achieve this the catalyst and accelerator should have a molecular size (as indicated by molecular weight) to enable this to take place. The molecular weight of each of Benzoyl Peroxide and diethyl aniline as approx $100\mu$ and is sufficiently small so that the molecules thereof can be driven into the fores of the particles.

The concept of driving catalyst and/or accelerator into the pores of the microporous particles is an important ancillary feature of the invention and also is an independent invention.

The Polyester resin matrix on the other hand has a molecular weight in the order of 10,000 and therefore when the mixture of resin matrix and microporous particles is subsequently subjected to ultrasonic energy the resin molecules will not enter the pores but will bombard the microporous particles, releasing the absorbent catalyst and/or accelerator providing a rapid and even cure.

The particles of clay it should be mentioned are held together to form the particles by electrostatic action, and the aforesaid bombardment also generates heat. Heat has a thermo electric effect which destroys the electrostatic attraction between the platelets so that the pores open and this enhances the effect of release of the catalyst and/or accelerator so that curing takes place evenly and rapidly.

Instead of applying ultrasonic energy to release the catalyst and/or accelerator, heat may be applied by other means to produce the same effect. Thus, heat may be applied in the conventional way using hot water, hot gas or steam.

Another method involves embodying in the resin along with the microporous particles additional particles which can be heated by applied radiation, such as ferromagnetic particles, especially ferrite particles having a CURIE temperature. When such particles are heated by such radiation, the heat in the additional particles provides the same effect as described above for the release of the catalyst and/or accelerator and rapid and even core of resin matrix.

In a modification the said additional particles may form the impervious particles, if they are of the appropriate structures having pores for the absorbing of the catalyst and/or accelerator. In such case, the inductive heating of the particles should provide even further release of the catalyst and/or accelerator, and more rapid cure of the resin matrix.

To enhance the release of the catalyst and promoter when the resin and microporous particles are subjected to the energy to release the catalyst and promoter, the resin may include the additive hexametaphosphate which functions to release the catalyst and promoter at an accelerated rate.

When an ultrasonic generator is used to release the catalyst and/or promoter, the ultrasonic generator described in International Patent Application No PCT/GB93/00107 or in U.S. Pat. No. 5,200,666 may be used.

As stated herein it has been found that the use of ultrasonic energy can achieve impregnation of various materials into others and as applied to the lining of underground pipelines and passageways as discussed above, a curing agent can be caused to be absorbed into the pores of micro porous particles and also that the particles themselves can be caused to be absorbed in an absorbent lining material.

According to the present invention therefore in another aspect, a first material is caused to impregnate a second material by the application of sonic energy to the materials when in close proximity.

In one example, where a resin curing agent in liquid form is mixed with microporous particles, and sonic energy is applied thereto it has been found that the curing agent is absorbed into the particles. The amount of curing agent which is taken up by the particles depends upon the level of and length of time of application of the sonic energy but good results have been obtained using Benzoyl Peroxide as the curing agent and Bentonite of average particle size of 5 micron.

It has also been discovered that the particles, such as the microporous particles mentioned above, with or without the Benzoyl Peroxide adsorbed therein, can be caused to impregnate textile sheets such as the felt sheets used to provide the absorbent materials of underground pipe linings, by the application of sonic energy. Thus, if the particles are carried in a liquid in suspension, and a piece of the felt is immersed in the suspension and an ultrasonic probe is inserted therein and driven, the particles are observed to move into the spaces between fibers of the felt, thereby to impregnate the felt which, as explained hereinafter is of considerable advantage in the field of lining pipelines and passageways in which we are particularly interested.

In order to illustrate the various aspects of the invention reference will now be made, by way of example, with reference to the accompanying diagrammatic drawings, wherein.

Figure 1A:
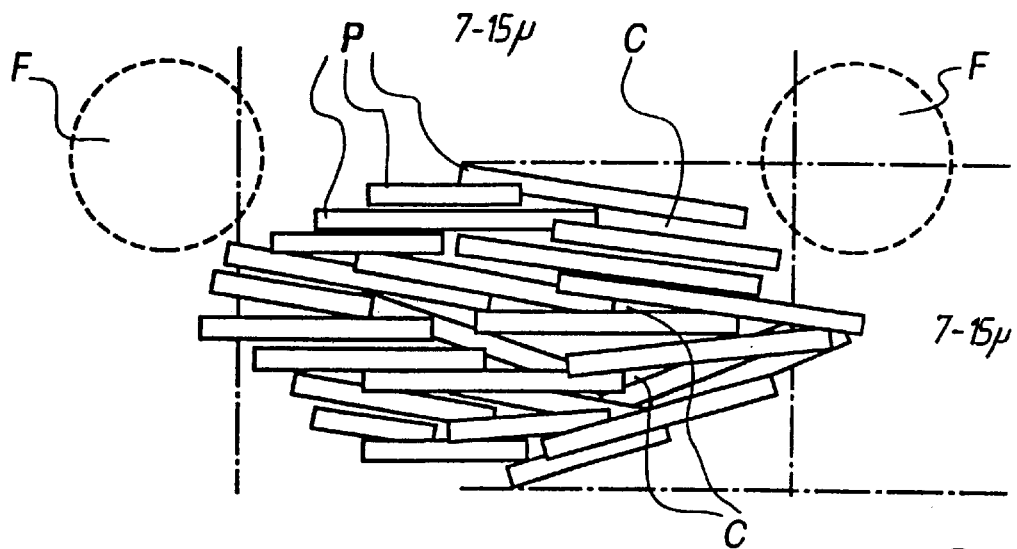
FIG. 1A is an enlarged view of a typical microporous clay particle.

The present invention in one embodiment makes major use of sonic energy, ultrasonic or audible energy, to achieve impregnation. In a specific example, the area of application as indicated herein relates to the lining of pipelines and passageways wherein a lining tube is impregnated with a curable synthetic resin which remains uncured until steps are taken to initiate the cure. Specifically, in the examples herein described, micro porous particles are embedded in the lining material. These particles have absorbed therein the curing agent for the resin so that when the lining subsequently is subjected to sonic energy especially ultrasonic energy the curing agent which is absorbed in the particles as released into the surrounding resin matrix effecting initiation at least of the cure of the resin. Specifically, the material which is released from the particles will be sufficient to effect complete cure of the resin.

Again, with specific reference to the lining of underground pipelines and passageways, a suitable absorbent material for the lining is needled felt comprising polyester or the like fibres. Other materials can of course be used. As disclosed in the said UK patent 1449445, the felt is saturated with so as to become impregnated with the resin and in the examples of the present invention, that resin will also contain the micro porous particles so that the particles will be distributed throughout the lining. The particles can be introduced into the lining in one of two methods. The particles can either be caused to impregnate the felt before the resin matrix is added, or the particles can be mixed with the matrix and then the mixture of matrix and particles used to impregnate the felt. In the first case, the impregnation of the felt with the particles will be referred to as a "dry" impregnation process (although liquids are used) and in the other case where the resin mixed with the particles is used to impregnate the felt, this will be referred to as the "wet" impregnation process.

In order to effect either the dry or the wet impregnation process it is necessary to introduce the resin curing agent into the micro porous particles. Specifically, tests have been carried out using micro porous particles of a clay material (as specified hereinbefore) and the curing agent which is used so as to be absorbed into these particles is Dibenzoyl Peroxide and according to this invention ultrasonic energy is used to effect the absorption of the Benzoyl Peroxide into the clay particles. Because of the role the particles have to perform i.e. carrying the curing agent for curing the resin impregnating the felt lining material of a tube for lining pipelines and passageways, desireably the particles should be of a relatively small size so that they will enter the spaces between the fibres of the felt and be distributed throughout the felt material in either the wet or dry process. In this connection therefore the particles preferably are of a size in the order of 5–15 micron. Larger sized particles can be used but this means that coarser felt material must be used for the lining material. Where a promoter and catalyst are used the catalyst may be absorbed in a first group of particles, whilst the promoter may be absorbed in a second group of particles.

In the first stage of preparation therefore steps were taken to ascertain whether or not the Benzoyl Peroxide was being absorbed into the clay particles when certain mixtures were subjected to ultrasonic energy. After being subjected to ultrasonic energy to the extent as described hereinafter, the character of the particles in fact changed.

Figure 3:
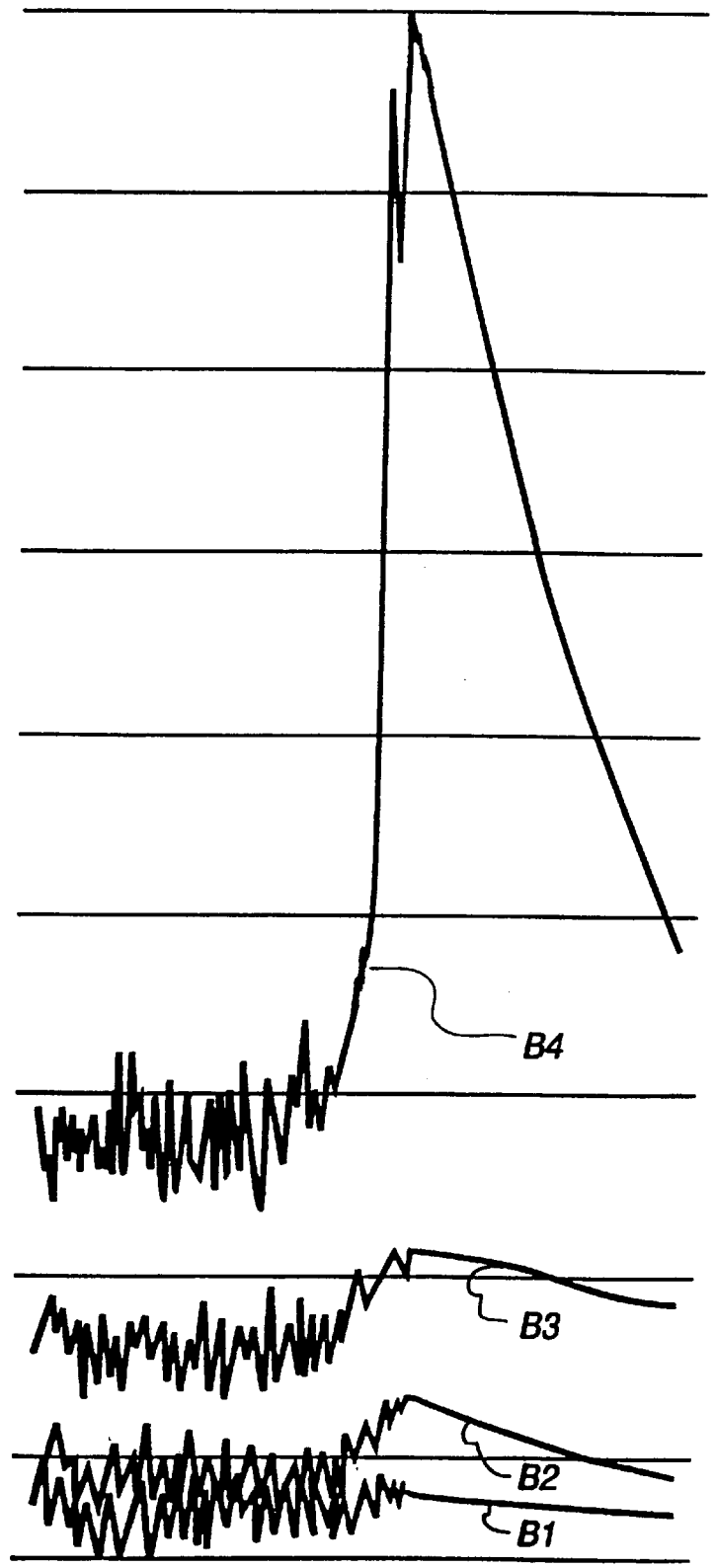
FIG. 3 is a graph showing the release of curing agent under various conditions and when the a resin is modified.

The change was that [can be better seen in FIG. 3 which is a photograph to an even greater extent of magnification. In FIG. 3] the particles became [are shown to be] somewhat flaky and it can be appreciated that crevices and pores in the particle are somewhat increased. It is into these crevices and pores that the curing agent passes as will now be explained.

The sonification of the clay particles has the effect of reducing particle size and therefore increasing the surface area of the particles.

To carry out the test, the clay particles were mixed with Benzoyl Peroxide in powder form and Toluene as the solvent for the Benzoyl Peroxide.

This mixture was then subjected to ultrasonic energy by the insertion of an ultrasonic probe running at a power of 60 watts and a frequency of 20 kilohertz. The sample comprised 10 grams of Benzoyl Peroxide, 30 grams of clay and 150 mm of Toluene.

In the first test, the sample was maintained at a temperature of 25° C., whilst in the second test the temperature was allowed to rise to 60° C., the same ultrasonic power being applied. To apply the power the ultrasonic probe was immersed in the mixture.

In order to provide meaningful results, a comparative test and a weighing test were performed. The comparative test comprised simply mechanically mixing the ingredients in order to ascertain if there was any take up of Benzoyl Peroxide by involved weighing the particles and liquid phases before and after adsorption.

Firstly, a qualitative set of tests were performed on the resulting materials. The first test was to ascertain if the Benzoyl Peroxide had been adsorbed into the clay particles and if so how much. To perform this qualitative test potassium iodide in the form of a 5% solution was mixed with a 3% standard solution of starch and this mixture was added to the clay particles after filtering same from the residue of the Benzoyl Peroxide and Toluene. If Benzoyl Peroxide is absorbed and is present it will mix with the potassium iodide to turn it to iodine, and this is indicated by a change from a colourless form to a red form. The samples which were subjected to sonification showed this change and the change took place relatively quickly over a short period in the order of 1 minute. The particles from the comparative sample on the other hand changed only to a light red colour over a relatively long period in the order of 24 hours indicating that not much Benzoyl Peroxide had been taken up.

Next, qualitative testing was performed using a UV spectrometer.

Figure 2:
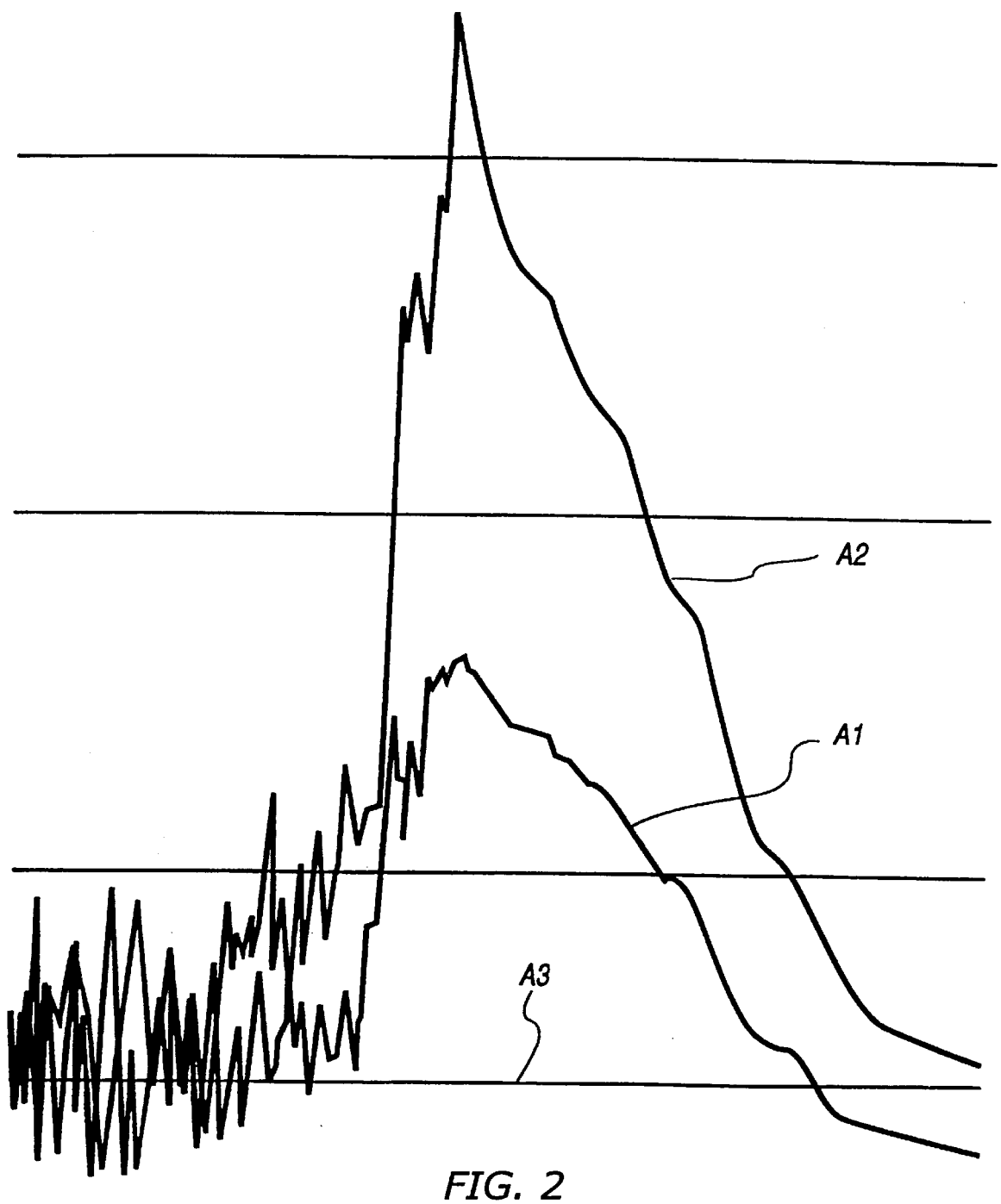
FIG. 2 is a graph showing the release of curing agent from the particles under various conditions.

The clay particles known to have the Benzoyl Peroxide adsorbed therein from the qualitative were mixed with styrene or Toluene as carrier in the ratio 5 grams of clay particles to 200 ml of carrier and on aliquot portions comparative tests were performed using Beer Lambert Plots which provided adsorption and concentration indications. FIG. 2 shows the Beer Lambert Plots obtained after the aliquots were respectively subjected to sonication to different extents as indicated by graphs A1 and A2 and also shown for comparison is graph A3 which represents an aliquot which was not subjected to sonication. Graph A3 shows that if the aliquot is not subjected to sonication there is no desorption of Benzoyl Peroxide at least over the period of the test which was 24 hours.

As regards graph A1 this aliquot was subjected to sonication at 20 kilohertz at a temperature held at 25° C. by water circulation and the sonication time was 40 minutes. Noticeable Benzoyl Peroxide desorption is indicated, but if one refers to graph A2, where no cooling is applied there is considerable desorption of the Benzoyl Peroxide even if sonication takes place only over a relatively short time of 3 minutes. The temperature rise to 60° C. is due to energy up take. These results show therefore that sonication can be used to cause absorption of the curing agent Benzoyl Peroxide, and equally, when the particles are mixed with the resin matrix, the curing agent can be caused to desorb selectively from the particles. Clearly use could be made of this in order to control the time when the resin matrix cures. Controlling whether or not the Benzoyl Peroxide is absorbed or desorbed when subjected to sonication is effected by selection of the medium or solvent in which the Benzoyl Peroxide is contained. There is a relationship between the pore size of the clay particles and the molecular size of the material used for suspending the Benzoyl Peroxide during adsorption band for desorbing the Benzoyl Peroxide during desorption as explained hereinbefore.

Referring to FIGS. 1, B and C, these figures have been included in an effort to indicate the relieved sequence of events regarding the manner in which the microporous particles function.

FIG. 1A is a greatly enlarged sectional view of a microporous clay particle, and it will be seen to comprise a multiplicity of platelets P which are held together by electrostatic attraction. Between the platelets are micropores or cavities C which receive the resin curing agent which will either be a catalyst or a promoter. It will be assumed for the purpose of this discussion that the curing agent is the resin catalyst and in particular is Benzoyl Peroxide.

Figure 1B:
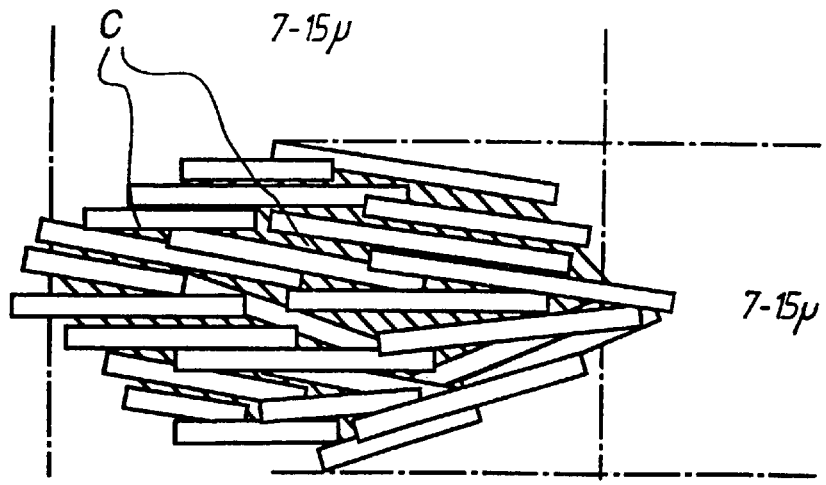
FIG. 1B is a view of the particle of FIG. 3A when it contains a resin curing agent (catalyst or accelerator)
Figure 1C:
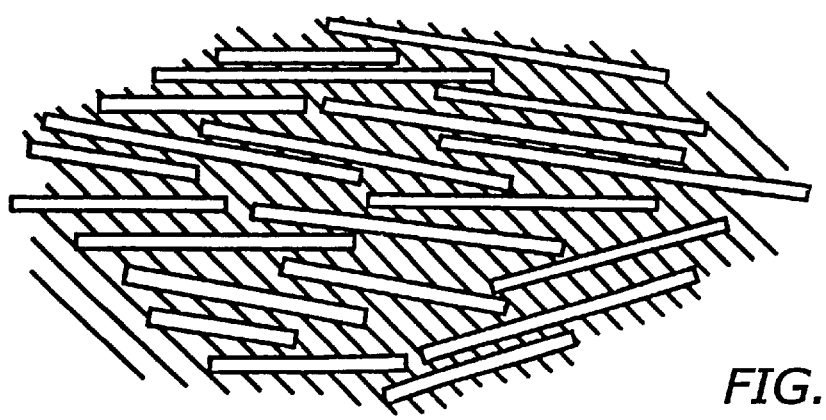
FIG. 1C is a view of the particles of FIG. 3A as it releases its curing agent.

In order to have the microporous particle of FIG. 1A receive the catalyst in the cavity C, the particle along with all of the others is mixed with a solution comprising Benzoyl Peroxide and Toluene of which further particulars are given hereinafter. The resulting mixture is subjected to ultrasonic energy, and this has the effect of causing the Benzoyl Peroxide to enter the cavity C as shown in cross-hatching in FIG. 1B. The Benzoyl Peroxide is forced into the cavity C by the ultrasonic energy, and the particle may undergo a slight expansion. FIGS. 1A and 1B show that the particle is of a size in the order of 7–15 micron. The particle in this condition i.e. when it is "filled" with the curing agent can and does remain quite stable for long periods. This is true even if the particle is immersed in a resin matrix such as a polyester matrix for which Benzoyl Peroxide is a curing agent. The cavities are so small that the curing agent does not flow therefrom into the surrounding matrix to any extent as would cause premature curing. A resin mixture comprising a matrix and these filled particles can therefore be employed to impregnate the lining tube at any time selected by the user. The impregnated lining tube can therefore be stored ready for use when required. That is to say the curing can be triggered if the Benzoyl Peroxide can be released from the particle cavities C. As will be appreciated from this specification, this is in fact what is subsequently done, and when the lining tube has been placed in position on the surface of a passage which it is to line, and a tube is subjected to energy, that energy is selected so as to cause the particle to expand or in fact disintegrate as shown in FIG. 1C whereby the electrostatic attraction between the platelets P is released or reduced and they open up releasing the Benzoyl Peroxide as indicated by hatching in FIG. 1C. Preferably, the energy used will be ultrasonic energy, but it has been found that direct heat can achieve the same effect. It will be understood that when ultrasonic energy is used, heat is created in the resin matrix. The result is that the released catalyst causes cure of the surrounding resin matrix, and when it is remembered that these particles will be distributed throughout the resin, quick and even curing of the resin is achieved, thereby meeting the installers requirements for a fully latent resin system.

Applying this technological development to the lining of pipelines and passageways, it can be seen that the invention provides a means for preparation of the particles which contain the curing agent, and it is also established that when these particles are subjected to sonication, the Benzoyl Peroxide can be desorbed into the surrounding matrix whereby installers can now by the use of ultrasonic or other energy control the release of the curing agent so that curing of the lining tube can be effected when required and under accurate control. This concept can of course be applied to any system involving the curing of synthetic resin, for example to form articles or to provide fillings for cavities and so on.

Further experiments have suggested that by introducing a sonic neutralizer material further enhanced results concerning the desorbing of the Benzoyl Peroxide can be achieved. One such sonic neutralizer material which has been used in tests is the material sodium hexametaphosphate (SMP) which as shown in FIG. 3 has the effect of causing desorbing of the Benzoyl Peroxide at an incredibly fast rate when the particles are subjected to sonic energy. In the tests of which the results are illustrated by FIG. 3, 0.1 grams of the SMP was mixed with the clay particles in which the Benzoyl Peroxide was adsorbed as previously described, and these were mixed in turn with 200 ml of styrene. A first sample was gently swirled. A second sample was subjected to mechanical stirring, a third sample was subjected to vigorous stirring, and a fourth sample was subjected to sonication at 20 kilohertz for 10 seconds. The results are illustrated in FIG. 3 by the graphs B1, B2, B3 and B4 which are graphs illustrating Benzoyl Peroxide desorption when examined by a UV spectrometer to provide Beer Lambert Plots.

Examining the graphs B1–B4 it can be seen that when the first sample was gently swirled, there was no desorption of the Benzoyl Peroxide. Mechanical stirring as indicated by graph B2 for 60 minutes indicates only a very small amount of Peroxide desorption and there is not much greater desorption of the Benzoyl Peroxide when the third sample was vigorously stirred for 30 minutes.

However, when the fourth sample was subjected to the sonication at 20 kilohertz for 10 seconds, the desorption of the Benzoyl Peroxide out of the clay is spectacular.

These results indicate that with the addition of a sonic neutralizer which we believe has the effect of breaking down the clay particles, desorption becomes extremely efficient and indeed appears to be so efficient that the resin matrix may be utilized without any promoter or accelerator. It is usual when curing a polyester matrix resin with Benzoyl Peroxide to use an accelerator to assist the cure, but if desorption of the Benzoyl Peroxide from the clay particles takes place under sonication as efficiently as indicated by graph B4 then such accelerator may well be omitted.

As concerns the incorporation of applying the particles in a felt lining tube for a pipelining arrangement as described herein, it has furthermore been discovered that if the particles are suspended in an appropriate solution and the lining tube is immersed therein, and the solution is subjected to sonic energy as indicated above, then the particles in fact migrate into the felt and impregnate same. The felt subsequently can be removed and dried to remove liquid so that one achieves a dry state felt with the particles distributed throughout. This again provides considerable advantage for the pipeline installer, because felts can contain the catalyst ready to receive promotor containing particles the resin matrix at the appropriate time. This may represent a considerable advantage because the particles will be subjected to less mechanical stress and shearing forces such as would occur when the particles are mixed with the resin matrix for wet lining operations.

The present invention therefore provides that resin absorbent materials may have distributed therein microporous particles by the use of sonic energy.

Figure 4:
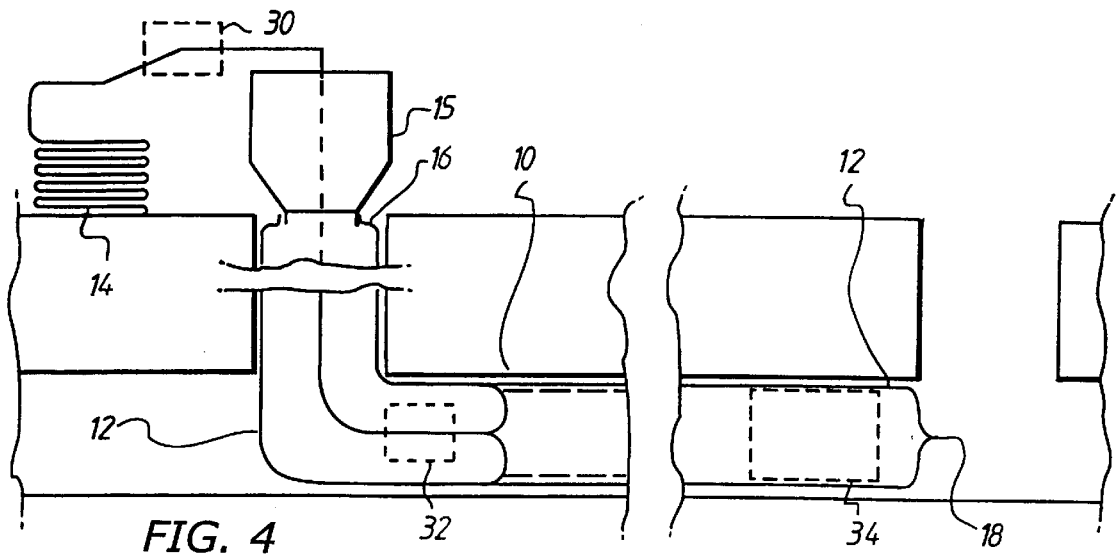
FIG. 4 is a sectional side elevation showing a lining operation in progress, the operation being for the application of a flexible lining tube according to the invention to an underground passage.

Referring now to FIG. 4, an underground passageway in the form of a sewer pipe 10 is being lined by means of a flexible tube 12 supplied from a supply 14 of such tube. The tube is delivered and everted into the sewer 10 by means of a pump unit 14 which is of the design construction and function as set forth in International Patent Application PCT/GB91/01603 and U.S. Pat. No. 5,154,936. This unit 14 serves to pump and evert the tube 12 as shown in FIG. 4. A leading end 16 of the tube may be anchored to the outlet of the unit 15.

The right hand portion of FIG. 4 shows the tube 12 fully positioned and it is illustrated as having a closed trailing end 18. To said end 18 there may be attached a hold back rope, cable or the like in order to prevent the rope 18 from rupturing under the eversion pressure.

A specific application of use of the microporous particles in connection with pipe lining operations will now be described with reference to FIGS. 4 to 6.

Figure 5:
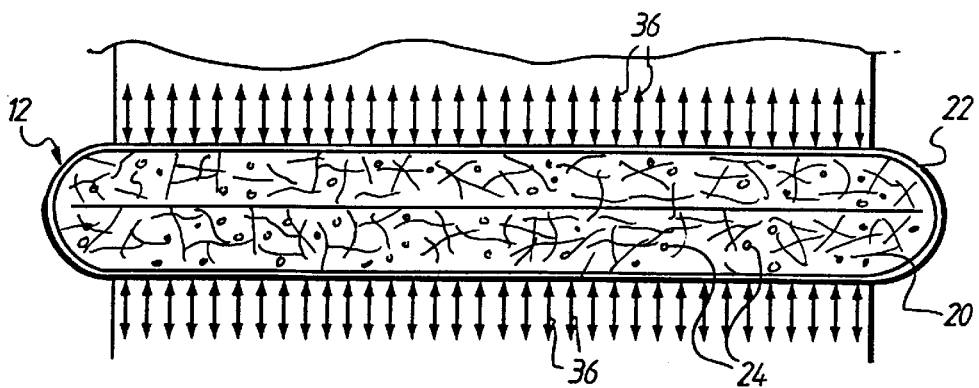
FIG. 5 is an enlarged sectional elevation of the lining tube which is adopted for the process of FIG. 1.
Figure 6:
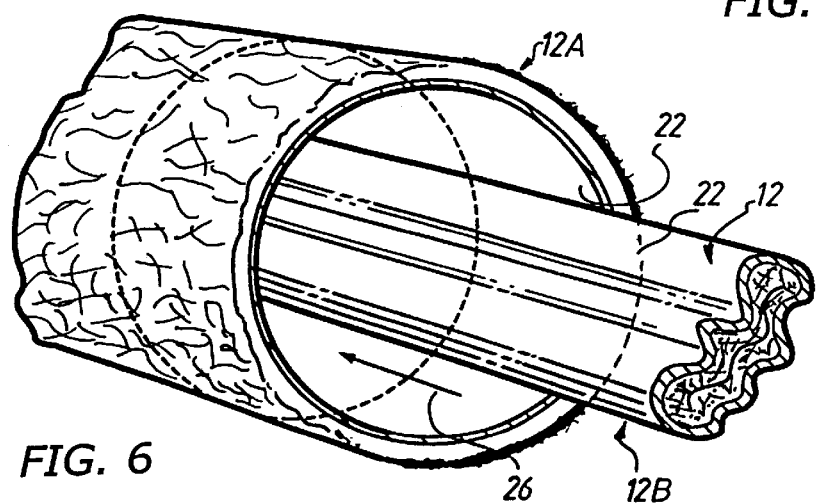
FIG. 6 is a perspective view illustrating how the lining tube is everted into position in the pipeline or passageway.

It is convenient now to refer to FIG. 5 which shows the lining tube 12 in greater detail. Tube 12 will be seen to comprise a core section 20 which is made up of one or more layers of an absorbent material such as a fibrous felt or woven fabric or a combination of these materials or other suitable absorbent materials, and surrounding layer 20 is an impermeable layer 22 which typically in the case of the layer 20 being of polyester felt is of polyurethene film which is bonded to the outer layer of the felt 20.

The felt 20 in practise is impregnated with a curable synthetic resin, and also contained in the resin matrix are the microporous material particles as described herein which contain curing agent for the resin, said particles being indicated by reference 24 and being shown in enlarged scale for clarity. These particles will be much smaller e.g. in the order of 5–15 micron, and will be distributed throughout the resin matrix.

In the arrangement of FIG. 5, the tube 12 is shown in its manufactured condition i.e. before application to the sewer surface, and it will be understood that when the tube 12 is everted as shown in FIG. 4, the outer skin or membrane 22 will eventually lie to the inside of the applied tube. This is illustrated more particularly in FIG. 6 which shows the tube 12 in the process of eversion. A portion 12A has been everted, and the felt surface soaked with resin is turned outwardly whilst the membrane 22 is to the inside, whilst the portion 12B is the inwardly travelling portion, in that it moves in the direction of arrow 26 during eversion.

The resin remains uncured until the lining is subjected to energy in this case sonic energy to cause the curing agent to desorb as described hereinbefore. Sonic energy may be applied at one or more locations by ultrasonic generators for example at location 30 which is ahead of the pump unit 15, 32 on the inwardly travelling portion 12B of the lining tube or at 34 which shows that the sonic energy is applied to the lining tube after it has been everted on to the surface of the sewer 10. As an alternative to the sonic generator in the pipeline, heat can be applied by hot water which is circulated through the lining tube after it has been applied to the passageway surface. With the application of sonic energy (and heat when applied) the curing agent desorbs from the adsorbent particles and commences and effects the cure of the resin matrix. By this means, the start of curing can be controlled and the curing time can be substantially reduced.

The sonic generator as shown in FIG. 5 is designed to apply sonic energy to the lining tube 12 in that the generator applies energy as indicated by arrows 36 on the membrane surface 22. This energy as described herein releases the catalyst and/or promoter into the resin matrix initiating and/or effecting the cure and therefore this method has all the advantages of delayed and selective curing so that lining tubes can be pre-impregnated with the resin matrix and microporous particles adsorbent materials and stored until ready for installation which is a considerable advantage.

The microporous particles can be produced by any known means and can be used on their own or in conjunction with ferrite particles as hereinbefore described.

It is to be mentioned at this time that the materials which are used for the lining tube may be as described in the said U.K. Patents 1,340,068 and 1,449,445 to which reference is also made.

The dry impregnation method can be used for impregnation of the felt with the filled microporous particles and this may be achieved by passing the felt through a suspension bath containing the particles in suspension and which is subjected to sonication of appropriate wavelength and energy.

The invention utilizes ultrasonic energy with particular advantage in a number of aspects.

Firstly, ultrasonic energy is used for causing the catalyst/promoter to be adsorbed into the microporous particles.

Secondly, sonic energy is used in the curing stage for causing desorbing of the curing agent from the particles. In this connection the resin matrix may include a sonic neutralizer such as SHP, and by the use of sonic energy to desorb the curing agent, efficient control over the curing time cycle may be achieved. Control of the cure of the lining tube may therefore be effected efficiently. The cure of the lining tube may be effected initially above ground as illustrated in the drawings, and may be continued if necessary after the lining tube has been placed in position on the pipeline or passageway. Alternatively, the curing may be effected after the lining tube has been placed in position by using a sonic generator inside the pipe. This method may be particularly efficient if the resin includes the SXP because cure can be effected in a remarkably short time, which has considerable advantage.

Thirdly, sonic energy can be used for impregnating the felt with the particles in the dry method, although the particles will be contained in a liquid suspension through which the felt is passed, and which is subjected to sonication in order to provide for take up of the particles. The felt subsequently will be dried to remove the liquid phase, and then the resulting impregnated felt can be further impregnated with the resin matrix as and when required.

The invention extends to these individual aspects singly or in combination. It applies generally to the field of impregnation of materials, and also specifically to the particular application of lining underground passageways and the various aspects thereof.

As to the sonic generator which is used in any particular application, it is preferred that a resonating generator, as described in U.S. Pat. No. 5,200,666 used as a single unit or as a double unit in order to achieve amplified sonic energy application, be used. The ultrasonic generators will be arranged in pairs for example as defining nip rolls through which the lining tube is passed in the specific application of the invention to the lining of pipelines and passageways. Sonic energy may be applied in a number of stages each comprising a pair of generators in the form of nip rolls arranged at spaced intervals in the direction in which the lining tube passes. Any sonic generator as appropriate may be adopted including RUM methods.

It has been mentioned herein that in the absorbing and desorbing of the curing agent, absorbing and desorbing is achieved depending upon the use of the solvent in which the particles are contained. In the case of absorbing of the curing agent, this is achieved by using a solvent of a similar molecular size to that of the curing agent e.g. Benzoyl Peroxide and Toluene, and Benzoyl Peroxide and Toluene are absorbed in the same ratio. When it is desired however to desorb the Benzoyl Peroxide when it is subjected to sonic energy, the particles should be contained in a solvent which has a smaller molecular size than the Benzoyl Peroxide so that it will displace the Benzoyl Peroxide to desorb same.

The sonic neutralizer SMP which is referred herein is one of a number of materials which act to break down clay under sonic energy. It is believed to be an ionic neutralizer.

As to the step of subjecting the particles to sonication for absorbing of the Benzoyl Peroxide, tests have shown that up to 60% by weight of Benzoyl Peroxide can be adsorbed into the clay particles after 20 minutes sonication and 30% by weight can be adsorbed after 10 minutes sonication, and these figures take into account any Benzoyl Peroxide that may be removed following washing of the absorbent particles.

When the lining tube impregnated with the resin and including the particles is subjected to ultrasound, the ultrasound may have the effect of heating the tube which in turn has the effect of causing desorbing of the Benzoyl Peroxide.

An advantage of the use of ultrasonics as referred to herein means that the lining tubes can be manufactured with conventionally used materials and using conventionally used resin systems. It may be necessary to apply a secondary coating to the particles in which the Benzoyl Peroxide is adsorbed in order to limit desorption until specifically required.

It has been further discovered that desorption of the curing agent can be achieved in any embodiment of the invention if the adsorbent particles can be heated. The heat it is believed has the effect of expanding the particles or at least the pores thereof as described herein causing the retained curing agent to desorb into the surrounding resin matrix. This happens even when the microporous particles are coated for the retention of the curing agent; the coating breaks due to the particle expansion and/or melts under the heating action.

A particularly advantageous release of the curing agent from the adsorbent particles therefore is achieved if the resin matrix contains magnetically permeable particles such as ferrites in which heat can be generated by creating eddy currents and hysteresis losses in the particles. According to a preferred arrangement of the invention therefore the resin matrix in addition to the adsorbent particles contains particles such as ferrites (for example as indicated at F in FIG. 1A) which can be heated when subjected to an alternating magnetic field, and such a field is applied to the resin material preferably when contained in the lining tube in order to heat the particles to provide the desorbing of the resin and curing of the same. A particular advantage is obtained if the magnetically permeable particles are ferrites having a CURIE temperature of a value for example of 80° C. to 150° C. which limits the extent to which the ferrite is heated so that the particles do not become excessively hot, by which is meant that the particles do not burn the resin or the material impregnated thereby.

Any suitable means of providing the alternating magnetic field may be provided, although the machine set forth in UK patent application No 9409014.9 is preferred. The alternating magnetic field may be applied at any one or more of the locations 30, 32 and 34 (FIG. 5) and may be in addition to or in place of the ultrasonic energy.

Again, it is to be mentioned that heat can be generated in the resin matrix by using conductive particles and by applying an alternating electric field or by creating electric currents using resistance heating by applying an electric potential across the resin matrix material.

The magnetically permeable particles and/or the conductive particles may be contained in the resin and/or in the microporous particles.

I claim:

1. A flexible lining tube (12) for cured in place lining of pipelines and passageways (10) comprising, a resin absorbent material layer (20) which is impregnated with a curable synthetic resin containing microporous particulate material (24) distributed therein, said microporous particulate material (24) having a curing agent for the resin retained in the pores preventing curing of the resin until the curing agent is released by the application of energy thereto enabling the lining tube to be stored and used when required.

2. The lining tube of claim 1, wherein the microporous particular material (24) is a clay.

3. The lining tube of claim 1, wherein the synthetic resin includes magnetically permeable particles dispersed therein.

4. The lining tube of claim 1, wherein the magnetically permeable particles are in the resin matrix by being embodied in the microporous particles (24).

5. The flexible lining tube of claim 1, wherein said curing agent includes a catalyst for the resin.

6. The flexible lining tube of claim 1, wherein said curing agent includes an accelerator for the resin.

7. The flexible lining tube of claim 1, wherein the microporous particles (24) are in a first and a second group and the curing agent includes a catalyst in the first group of the microporous particles (24) and an accelerator in the second group of the microporous particles (24).

8. The lining tube of claim 7, wherein that said first group of particles (24) are of clay of a first type and the said second group of particles (24) are of a clay of a second type.

9. The lining tube of claim 1, wherein said absorbent layer (20) is of a fibrous felt.

10. The lining tube of claim 1, wherein the lining tube (12) has an outer layer (22) in the form of a coating or film of impermeable material.

11. A method of rendering flexible lining tube (12) having an absorbent layer (20) suitable for lining an underground pipeline or passageway, comprising disposing throughout the absorbent layer microporous particles (24) having a resin curing agent in the pores thereof by bringing the microporous particles (24) and absorbent layer (2) into close proximity and subjecting the layer (20) and particles (24) to sonic energy to cause the particles to migrate into the absorbent layer (20).

12. The method of claim 11, including carrying the particles (24) in a liquid in suspension and immersing the lining tube (12) in the suspension, the whole being subjected to sonic energy.

13. The method of claim 11, including applying the sonic energy by means of an ultrasonic probe and plate or pair of such probes or plates.

14. A method of lining a pipeline or passageway (10) using a flexible lining tube (12) having a resin absorbent layer (20) impregnated with a curable resin matrix including first particles (2) containing curing agent for the resin, and selectively releasable therefrom by the application of energy comprising, (a) applying the lining tube (12) to the surface of the passageway (10) or inner surface of the pipeline (10) by fluid pressure whilst the lining tube (12) is flexible, (b) applying energy to the tube (12) so that curing agent is released from the resin matrix and cures the resin as the tube (12) is so held against the said surface, (c) wherein the first particles (24) are microporous and the curing agent is contained in the pores thereof and the resin contains second and magnetically permeable particles and the energy applied comprises an alternating magnetic field, and (d) whereby the magnetically permeable particles are heated which in turn causes desorbing of the curing agent from said microporous particles (24).

15. The method of claim 14, including selecting magnetically permeable particles that are ferrites having a CURIE temperature selected not to damage the resin or the absorbent material (20).

16. The method of claim 15, wherein the CURIE temperature of the magnetically permeable particles (24) is in the range of 80° to 150° C.

* * * * *